US009392773B2

(12) United States Patent
Willis et al.

(10) Patent No.: US 9,392,773 B2
(45) Date of Patent: Jul. 19, 2016

(54) ANIMAL DRINKER

(71) Applicant: Lubing Maschinenfabrik Ludwig Bening GmbH & Co. KG, Barnstorf (DE)

(72) Inventors: Timothy Shawn Willis, Cleveland, TN (US); Charles Ollin Willis, Jr., Cleveland, TN (US); Barry Dustin Hicks, Georgetown, TN (US)

(73) Assignee: Lubing Maschinenfabrik Ludwig Bening GmbH & Co. KG, Barnstorf (DE)

( * ) Notice: Subject to any disclaimer, the term of this patent is extended or adjusted under 35 U.S.C. 154(b) by 243 days.

(21) Appl. No.: 14/173,939

(22) Filed: Feb. 6, 2014

(65) Prior Publication Data

US 2014/0224180 A1    Aug. 14, 2014

(30) Foreign Application Priority Data

Feb. 13, 2013 (DE) .......................... 10 2013 002 394

(51) Int. Cl.
*A01K 7/00* (2006.01)
*A01K 39/02* (2006.01)
(52) U.S. Cl.
CPC ............. *A01K 39/02* (2013.01); *A01K 39/0213* (2013.01)
(58) Field of Classification Search
CPC .................................................. A01K 39/0213
USPC .......................................................... 119/72
See application file for complete search history.

(56) References Cited

U.S. PATENT DOCUMENTS

| 3,483,847 | A | * | 12/1969 | Kneubuehl | ............. | A01K 39/02 |
| | | | | | | 119/72.5 |
| 3,486,735 | A | * | 12/1969 | Smith | ....................... | A01K 7/06 |
| | | | | | | 222/402.25 |
| 3,590,781 | A | * | 7/1971 | Spencer | .................. | F16K 31/58 |
| | | | | | | 119/72.5 |
| 4,516,533 | A | * | 5/1985 | Mallinson | ............ | A01K 39/022 |
| | | | | | | 119/72 |
| 4,637,345 | A | * | 1/1987 | Hostetler | ........... | A01K 39/0213 |
| | | | | | | 119/72.5 |
| 4,660,509 | A | * | 4/1987 | Steudler, Jr. | ....... | A01K 39/0213 |
| | | | | | | 119/72.5 |
| 4,984,537 | A | * | 1/1991 | Steudler, Jr. | ....... | A01K 39/0213 |
| | | | | | | 119/72.5 |

(Continued)

FOREIGN PATENT DOCUMENTS

| DE | 9315617 U1 | 3/1994 |
| DE | 202005020411 U1 | 4/2006 |
| EP | 0332852 A1 | 9/1989 |

OTHER PUBLICATIONS

European Patent Office, Europaischer Recherchenbericht (patent search on priority patent application), Jun. 4, 2014.

*Primary Examiner* — Kristen C Hayes
(74) *Attorney, Agent, or Firm* — Laurence P. Colton; Smith Tempel Blaha LLC

(57) ABSTRACT

An actuating means (25) for an animal drinker, the actuating means configured in such a way that the valve pin (14) is liftable by the actuating means (25) in order to open the drinking valve (12), preferably on a rectilinear longitudinal center axis (19) of the valve pin (14). In this way, one-sided wearing down of the drinking valve (12), in particular of the valve pin (14) and/or of a sealing surface (17) of the housing (13), is avoided. As a result, the useful life of the drinking valve (12) is extended.

24 Claims, 8 Drawing Sheets

(56) References Cited

U.S. PATENT DOCUMENTS

| | | | | |
|---|---|---|---|---|
| 5,009,194 A * | 4/1991 | Hostetler | A01K 39/0213 | 119/72 |
| 5,154,138 A * | 10/1992 | Siddiqui | A01K 39/0213 | 119/72.5 |
| 5,245,950 A * | 9/1993 | Johnson | A01K 39/0213 | 119/72 |
| 5,329,877 A * | 7/1994 | Schumacher | A01K 39/0213 | 119/72.5 |
| 5,660,139 A * | 8/1997 | Hostetler | A01K 39/0213 | 119/72.5 |
| 6,073,584 A * | 6/2000 | Schumacher | A01K 39/0213 | 119/72 |
| 6,308,657 B1 * | 10/2001 | Schumacher | A01K 39/0213 | 119/72 |
| 6,938,578 B2 * | 9/2005 | Schumacher | A01K 39/0213 | 119/54 |
| 8,578,884 B2 * | 11/2013 | Hawk | A01K 7/00 | 119/72 |
| 2003/0084854 A1 * | 5/2003 | Schumacher | A01K 7/06 | 119/74 |
| 2005/0150464 A1 * | 7/2005 | Schumacher | A01K 39/0213 | 119/75 |
| 2007/0272165 A1 * | 11/2007 | von der Assen | A01K 39/0213 | 119/72 |
| 2012/0318202 A1 * | 12/2012 | Schumacher | A01K 39/0213 | 119/74 |

* cited by examiner

ANIMAL DRINKER

STATEMENT OF RELATED APPLICATIONS

This application claims the benefit of German Patent Application No. 10 2013 002 394.7 having a filing date of 13 Feb. 2013.

BACKGROUND OF THE INVENTION

1. Technical Field

The invention relates to an animal drinker for poultry, having a plurality of drinking valves assigned to a line-like water supply pipe, wherein each drinking valve has a housing and at least one valve body arranged in a movable manner therein, said valve body being assigned an actuating means, by way of which the valve body can be moved into the at least one position opening the respective drinking valve.

2. Prior Art

Poultry, for example turkeys, chickens, geese, ducks and also chicks can meet their water requirements themselves by way of animal drinkers of the type in question here. To this end, the animal drinker has an elongate water supply pipe which preferably has a plurality of drinking valves at regular intervals. Preferably, a water-collecting bowl is assigned to each drinking valve or at least to some drinking valves. Water discharged by the drinking valve collects therein, to be precise in particular spray which is not directly consumed by the animals. As soon as the water supply in the water-collecting bowl has been completely or largely used up, the animals can temporarily open the respective drinking valve preferably using their beaks, in order that fresh water runs into the water-collecting bowl again. However, it is also conceivable for the animals to directly drink the water emerging from the drinking valves.

Animal drinkers are known in which an additional actuating means is assigned to the valve body, embodied as a valve pin, that is used for actually opening and closing the drinking valve. The actuating means, which has preferably an elongate rod or an elongate tube, extends a lower end region, projecting out of the drinking valve, of the valve pin. This makes it easier especially for smaller animals, for example chicks, to open and close the drinking valve. By way of the actuating means, the respective drinking valve is also easier to reach, especially for smaller animals. However, it has been shown that the valve pin pivoted by the actuating means and/or the valve seat, assigned to said valve pin, in the housing of the drinking valve wear down on one side and as a result the drinking valve no longer closes reliably. The drinking valve then becomes unusable.

BRIEF SUMMARY OF THE INVENTION

The invention is based on the object of creating an animal drinker in which the drinking valves, in particular the valve body and/or sealing seat thereof, no longer wear down, or at least wear down less, on one side. As a result, the service life of the drinking valves of such an animal drinker is extended.

An animal drinker for achieving this object is an animal drinker for poultry, having a plurality of drinking valves assigned to a line-like water supply pipe, wherein each drinking valve has a housing and at least one valve body arranged in a movable manner therein, said valve body being assigned an actuating means, by way of which the valve body can be moved into the at least one position opening the respective drinking valve, characterized in that at least one valve body for opening the drinking valve is liftable by the actuating means. Accordingly, provision is made that, in order to open the drinking valve, the valve body is liftable by the mobile or movable actuating means. Preferably, the actuating means is configured such that it only lifts the at least one valve body in order to open the drinking valve.

When the drinking valve is opened by the valve body being lifted, the tilting or tipping, necessary in known animal drinkers of this kind, of the valve body in the housing of the drinking valve becomes superfluous. Instead, the valve body is moved by the actuating means preferably only on a vertical, rectilinear path. Because it is thus no longer necessary to tilt the valve body in order to open and also to close the drinking valve, drinking valves of the animal drinker according to the invention do not wear down, or no longer wear down significantly, on one side. As a result, the wear is reduced considerably and so drinking valves of the animal drinker according to the invention have a longer service life.

A configuration of the actuating means such that it lifts the valve body in a rectilinear manner, in particular on a vertical axis or movement path which, according to a particularly advantageous embodiment of the invention, is located on a longitudinal center axis of the drinking valve, is particularly advantageous.

In a preferred development of the animal drinker, provision is made for the actuating means to be provided with at least one guide track, for example a guide slot. The guide track is configured such that, when the actuating means is moved, in particular pivoted, said guide track at least lifts the valve body assigned to said actuating means or optionally a plurality of valve bodies arranged one above another. The at least one valve body is lowered automatically when the actuating means returns into its preferably vertically oriented, non-deflected rest position. When the valve body is in the lowered starting position, the drinking valve is closed. The guide track of the actuating means has such a profile that the valve body is lifted both when the actuating means is pivoted in one direction and when it is pivoted in the opposite direction, but the guide track no longer acts on the valve body with the actuating means pivoted back into the vertical starting position, and so said valve body can close the drinking valve automatically.

According to a further advantageous configuration of the drinking valve, provision is made for the valve body and/or the actuating means to be assigned a transmission means. The transmission means is arranged preferably between the valve body and the actuating means, preferably the guide track thereof. In particular, the transmission means can be provided under the valve body, where it is mounted preferably in a guided manner. The transmission means transmits the pivoting movement of the actuating means to the valve body such that the latter is not also deflected to the side and/or exposed to sideways directed forces when the actuating means is pivoted. Thus, the pivoting path of the actuating means is converted into an exclusively rectilinear upward movement of the valve body by the transmission means. Lateral forces brought about when the actuating means is pivoted to the side are absorbed and compensated by the transmission means, such that only a vertically upwardly directed force is exerted on the valve body by the transmission means, wherein this force preferably acts centrally on the valve body, namely lies on the longitudinal center axis of the valve body.

Preferably, the transmission means corresponds to the guide track of the actuating means. To this end, the transmission means can rest or be supported on the guide track of the actuating means. Thus, the transmission means can follow the contour of the guide track of the actuating means. The preferably hollow-like contour of the guide means pushes the transmission means vertically upwards in the event of a lateral deflection of the actuating means in any direction, such that said transmission means pushes vertically in a specific manner under the valve body, to be precise at a point located on the longitudinal center axis of the valve body. When the actuating means is deflected, the curved guide track thereof thus lifts the transmission means, which in turn actuates the at least one valve body, to be precise specifically only in such a way that it is pushed up merely vertically. As a result, tilting or tipping of the valve body does not happen, and this prevents one-sided wearing down of the head of the valve body or of the valve seat or other wear phenomena, or at least reduces this to such an extent that the service life of the drinking valve increases considerably.

Preferably a rolling body is suitable as the transmission means. The rolling body can in principle have any desired geometric shape, as long as it is rotatable about at least one rotation axis. Accordingly, the rolling body can be configured in a cylindrical or barrel-like manner. Preferably, however, the rolling body is a sphere. This can rotate about any desired axes, and as a result it ensures particularly easy pivotability of the actuating pin and specific lifting of the latter on an at least substantially rectilinear path. In this case, provision is preferably made for a rotation axis of the rolling body or of the sphere to perpendicularly intersect a longitudinal center axis of the valve body and/or for the rotation axis to extend horizontally. This ensures that the valve body is lifted substantially without tilting when the actuating means is deflected to the side, with the result that, in the case of a preferred embodiment of the transmission means as a sphere, deflection or tilting of the actuating means to the side can take place in any desired direction.

Another advantageous configuration of the animal drinker provides for the actuating means to pivot about a pivot axis. As a result, the actuating means is movable only in one plane, preferably a vertical plane, specifically in opposite directions. The pivot axis extends preferably transversely through the longitudinal center axis of the valve body, or of the drinking valve having the latter. In the case of the usually vertical longitudinal center axis of the valve body, the pivot axis of the actuating means thus extends horizontally. As a result, the actuating means is pivotable in opposite directions in a vertical plane. This particular arrangement of the actuating means ensures that the drinking valve is opened and closed by an up and down movement of the valve body that is directed exclusively or substantially exclusively in a vertical manner.

According to an advantageous development of the invention, the pivot axis of the actuating means is arranged above the valve body, to be precise in particular in a fixed position relative to the drinking valve. Preferably, the pivot axis is arranged at the level of the water supply pipe. As a result of this higher arrangement of the pivot axis, even a small pivoting movement of the actuating means lifts the valve body sufficiently to open the drinking valve. Furthermore, a relatively long lever arm, which ensures that the actuating means is pivoted easily at its free lower actuating end, on which the animals act with their beaks, is produced. The pivot axis, which is stationary with respect to the drinking valve, ensures that the actuating means is pivoted in a specifically guided manner, preferably that the actuating means is pivoted in a substantially play-free manner in the region of a vertical plane through the longitudinal center axis of the drinking valve.

Furthermore, provision is preferably made for the horizontal pivot axis of the actuating means to be arranged at a distance above the transmission means, in particular above the rotation axis of the rolling body or of the sphere. Advantageously, the pivot axis of the actuating means extends in this case parallel to the rotation axis of the rolling body or of the sphere. In this case, the crossing point of the pivot axis and the rotation axis is preferably located on the vertical longitudinal center axis of the drinking valve and at least of the valve body to which the actuating means is assigned. This particular arrangement of the pivot axis of the actuating means and of the rotation axis of the transmission means produces particularly advantageous conditions for reliable and specific opening and closing of the drinking valve by a predominantly or preferably only vertical up and down movement of the valve body on the longitudinal center axis of the drinking valve.

A particularly advantageous configuration of the animal drinker provides for the actuating means to be provided with an elongate rod or an elongate tube. Preferably, the actuating means also has a fork which is arranged at the upper end of the rod or of the tube. Preferably, the fork is integrally formed onto the upper end of the rod or of the tube. The elongate rod or the elongate tube forms a lever for easy pivoting of the actuating means, wherein the fork at the upper end of the rod or of the tube allows the actuating means to be mounted on the pivot axis in a reliable and substantially play-free manner. Preferably, provision is made for the preferably hollow-like guide track for the transmission means to be assigned to the fork, to be precise to a crosspiece, carrying the rod or the tube, thereof. As a result, the guide track is involved directly in the pivoting movement of the tube or of the rod of the actuating means and transmits the pivoting movement, via the rolling body arranged between the guide track and the valve body, to the at least one valve body, wherein at the same time the pivoting movement of the actuating means is converted into a pure lifting movement at least of the valve body.

Another preferred development of the invention provides for the actuating means to be mounted on the pivot axis by way of parallel legs of a fork. The fork ensures particularly reliable and lasting mounting of the actuating means on the pivot axis. Preferably, the actuating means is mounted on a holder, to be connected to the water supply pipe, by way of the parallel, vertical legs so as to be pivotable about the pivot axis. The holder can be fastened releasably to the water supply pipe so as to ensure easy fitting and removal for the possibly necessary exchange of the actuating means. The holder also produces reliable fastening of the actuating means in a fixed relative arrangement with respect to the drinking valve, without the drinking valve needing to be modified in a manner suitable for mounting the actuating means.

According to a conceivable development of the animal drinker, a guide may be provided in the lower end region of the drinking valve. Preferably, the guide is in the form of a guide sleeve. The guide, or guide sleeve, serves to hold a lower end region, projecting downwardly out of the drinking valve, of the valve body such that it is also held substantially without tilting under the housing of the drinking valve, and thus can move up and down essentially only on a vertical longitudinal center axis. Alternatively or in addition, the guide, or guide sleeve, can also serve to hold the transmission means, for example the rolling body or the sphere, such that it can move vertically up and down only in the guide or guide sleeve, to be precise in particular on a lower continuation of the longitudinal center axis of the valve body. This ensures that the valve body and/or the transmission means (rolling body or sphere) can only freely move up and down and lateral displacements of the transmission means and/or of the valve body—apart from the necessary small amount of play—do not happen.

Finally, an advantageous configuration of the invention provides for the free, lower end of the actuating means, preferably of the elongate rod or the elongate tube thereof, to extend into a water-accumulating space of the water-collecting bowl. As a result, the actuating means is also easily accessible to young animals.

Preferably, the pivoting travel of the actuating means, in particular of the rod or tube, is limited by a wall of the water-collecting bowl. Given appropriate dimensioning of the length and of the diameter of the rod or of the tube and of the water-collecting bowl, a pivoting travel is predefinable which meets the requirements and allows the drinking valve of the actuating means to be open sufficiently; however, excessive pivoting of the actuating means and damage brought about thereby are prevented in that the lower end of the actuating means comes to rest against the inner side of the water-collecting bowl before the tube or the rod of the actuating means is pivoted beyond a permissible degree. As a result, larger and older animals cannot impair or even damage the drinking device by excessive pivoting of the actuating means.

BRIEF DESCRIPTION OF THE DRAWINGS

Two preferred exemplary embodiments of the invention are explained in more detail in the following text with reference to the drawing, in which.

DETAILED DESCRIPTION OF PREFERRED EMBODIMENTS

Figure 1:
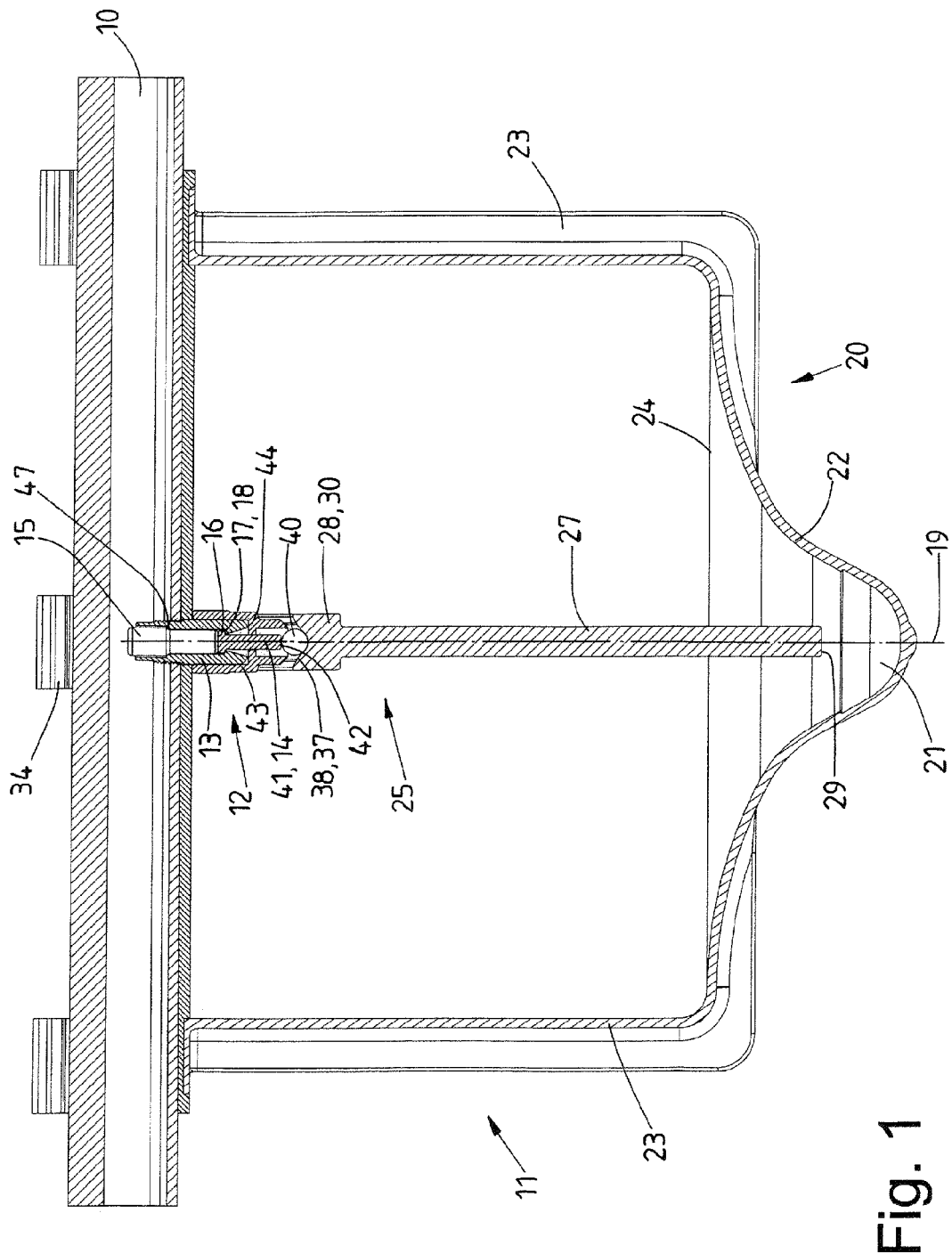
FIG. 1 shows a side view (with regard to the direction of longitudinal extent of a water supply pipe) of a first exemplary embodiment of an animal drinker in a closed position.

The animal drinker shown here is in the form of what is known as a drinking line for the floor management of poultry. The animal drinker allows all types of poultry, especially also young animals (chicks), to meet their water requirements themselves. In particular, the animal drinker shown here is used for supplying water to turkeys and turkey poults.

The animal drinker shown in the figures has an elongate, tubular water supply pipe 10 having a plurality of spaced-apart drinking points 11. All of the drinking points 11 are formed in an identical manner in the exemplary embodiment shown. The water supply pipe 10 is arranged in a horizontally directed manner in the barn on support cables (not shown) at an appropriate (small) distance from the ground. Drinking valves 12 are assigned to the water supply pipe 10 at regular intervals in the case of the animal drinker shown here. The drinking valves 12 are also formed identically to one another.

The drinking valves 12 shown here are those in which the housing 13 has in its upper end region an external thread, by way of which the drinking valves 12 are screwable into a corresponding threaded bore in the water supply pipe 10.

The drinking valves 12 in FIGS. 1 to 4 have two valve bodies mounted one above the other in the housing 13, to be more precise a valve pin 14 and an upper pin 15 arranged above the latter, said upper pin 15 projecting a short way upwardly out of the housing 13 in the exemplary embodiment shown. A lower end region of the valve pin 14 projects downwardly out of the housing 13 to form an actuating end.

The valve pin 14 has, at its upper end located in the housing 13, a head 16 which is formed in a cylindrical manner in the exemplary embodiment shown, but may also be configured in some other way. In the case of closed drinking valves 12, the valve pin 14 rests with the lower annular surface of its head 16 against a preferably also annular sealing surface 17 in the housing 13. The sealing surface 17 is formed in the region of a step in the housing 13. The annular surface on the underside of the head 16 of the valve pin 14 and the sealing surface 17, corresponding thereto, of the housing 13 together form a sealing seat 18 between the housing 13 and the valve pin 14, which is closed when the head 16 rests against the sealing surface 17. If the valve pin 14 moves upwards on its own or optionally together with the upper pin 15 on a longitudinal center axis 19 of the drinking valve 12, said longitudinal center axis 19 at the same time being the longitudinal center axis of the valve pin 14 and the upper pin 15, the drinking valve 12 opens in that the head 16 of the valve pin 14 is lifted from the sealing surface 17.

The valve pin 14, the upper pin 15 and the housing 13 of the drinking valve 12 shown in the figures are formed from stainless steel. However, at least the housing 13 can also consist entirely or partially of some other material, for example plastics material.

The drinking valve 12 shown in the figures is assigned a water-collecting bowl 20. Preferably, all of the other drinking valves 12 of the animal drinker are also assigned identical water-collecting bowls 20. The water-collecting bowl 20 shown in the figures is arranged centrally at a distance below the respective drinking valve 12, to be precise such that the lowest point 21 of the water-collecting bowl 20 is located on the (extended) longitudinal center axis 19 of the drinking valve 12. The water-collecting bowl 20 is mounted releasably, but in a stationary and non-movable manner, on the water supply pipe 10, to be precise such that a water-accommodating hollow 22 of the water-collecting bowl 20 is located at a distance below the drinking valve 12.

The water-collecting bowl 20 has the water-accommodating hollow 22 and two parallel, identical support arms 23 at opposite edges of the water-accommodating hollow 22. In the exemplary embodiment shown, the water-accommodating hollow 22 has an elongate, boat-like form. The cross-sectional form of the water-accommodating hollow 22 also changes from the lowest point 21 in the region of the floor to an upper edge 24, to be precise preferably continuously. The edge 24 is formed in an elliptical or oval manner in the case of the water-collecting bowl 20 shown. However, the edge 24 may alternatively also be circular or have other geometric shapes, including polygonal shapes.

The water-accommodating hollow 22 is oriented under the elongate water supply pipe such that the longer axis of the edge 24 of the water-accommodating hollow 22 extends in the longitudinal direction of the water supply pipe 10, to be precise is arranged at a parallel distance below the water supply pipe 10, such that a plane, in which the edge 24 of the water-accommodating hollow 22 is located, extends approximately horizontally.

The entire water-collecting bowl 20 is formed preferably in one piece from plastics material, to be precise preferably a thermoplastic.

The two support arms 23 of the water-collecting bowl 20 are arranged on opposite sides of that drinking valve 12 to which the water-collecting bowl 20 is assigned. Preferably, the drinking valve 12 is located centrally between the two parallel support arms 23. Below, the support arms 23 are integrally adjoined by the water-accommodating hollow 22 of the water-collecting bowl 20. Accordingly, the support arms 23 act on opposite ends of the long axis of the upper edge 24.

Each drinking valve 12 is assigned an actuating means 25. The actuating means 25 is assigned to the drinking valve 12 so as to be specifically pivotable about a horizontal pivot axis 26. The horizontal pivot axis 26 extends transversely to the longitudinal direction of the water supply pipe 10 and at the same time through the longitudinal center axis 19 of the drinking valve 12. The pivot axis 26 is located above the valve pin 14, preferably in the vicinity of an underside of the water supply pipe 10.

The actuating means 25 has a lower, elongate rod 27 and a fork 28 integrally formed at the upper end thereof. A free lower end 29 of the rod 27 projects into the water-collecting bowl 20 but ends there at a distance above the lowest point 21. Instead of the rod 27, the actuating means 25 can also have a tube or the like.

The fork 28 has a crosspiece 30, which is horizontal when the actuating means 25 is not deflected, and two parallel, vertical legs 31 at opposite edges of the crosspiece 30. The fork 28 is integrally formed on the rod 27 by way of the crosspiece 30. The legs 31 extend in parallel, upright planes on opposite sides of a longitudinal axis of the water supply pipe 10. Upper end regions of the legs 31 are provided with through-bores 32 which are located in opposite end regions of the pivot axis 26. The through-bores 32 of the fork 28 correspond with outwardly projecting bearing pins 33 of a holder 34 for the actuating means 25 on the water supply pipe 10. The bearing pins 33 are dimensioned such that they extend with play through the through-bores 32 in the legs 31 of the fork 28, such that the actuating means 25 is freely pivotable back and forth in opposite directions about the pivot axis 26, to be precise in a vertical plane through the longitudinal axis of the water supply pipe 10. As a result, the actuating means 25 is pivotable back and forth, in the longitudinal direction of the water supply pipe 10, out of a vertical, non-deflected starting position, in which the longitudinal axis of the rod 27 downwardly extends the longitudinal center axis 19 of the drinking valve 12.

The holder 34 for the actuating means 25 is releasably connected to the water supply pipe 10. To this end, the holder 34 has a latching closure 35 located over the water supply pipe 10. When the latching closure 35 is closed, the holder 34 completely surrounds the water supply pipe 10. Beneath the water supply pipe 10, the holder 34 has a through-bore 36 for the free passage of the drinking valve 12, which is screwable from below into the water supply pipe 10.

Centrally between the legs 31, a guide track 37 directed towards the drinking valve 12 is provided on the crosspiece 30. The guide track 37 is preferably integrally formed in an upwardly projecting manner on the upper side of the crosspiece 30. The guide track 37 is formed in a slot-like manner from a narrow material strip which extends in the longitudinal direction of the water supply pipe 10. To form the guide track 37, the upper side of the material strip is provided with a central hollow 38. The lowest point of the hollow 38 is located under the drinking valve 12 when the actuating means 25 is not deflected, to be precise centrally with respect to the longitudinal center axis 19 of the drinking valve 12. In the transverse direction of the water supply pipe 10, the hollow 38 of the guide track 37 is provided with a horizontal guide surface 39.

The guide track 37 is assigned a transmission means which, in the exemplary embodiment shown, is in the form of a rolling body, namely a sphere 40. The sphere 40 is located between the valve pin 14 and the guide track 37, wherein the valve pin 14 is located above or on the sphere 40 and the guide track 37 is located under the sphere 40, which is supported preferably on the guide track 37, to be precise both in the vertical starting position of the actuating means 25 and in the tilted position thereof. The sphere 40 can be formed from stainless steel, plastics material or other materials. The diameter of the sphere 40 is somewhat larger than the diameter of the lower end, projecting downwardly out of the drinking valve 12, of a rod-like valve needle 41 of the valve pin 14. Preferably, the diameter of the sphere 40 is about 1.5 to 2 times as large as the diameter of the valve needle 41 of the valve pin 14. The hollow 38 of the guide track 37 on the crosspiece 30 of the fork 28 corresponds, at least in a central section in the region of the lowest point, to the diameter of the sphere 40, but may also be somewhat larger. The center of the sphere 40 is located on the longitudinal center axis 19 of the drinking valve 12, as a result of which the sphere 40 is located centrally under the preferably flat, horizontal end face 42 of the valve needle 41 of the valve pin 14.

The transmission means, that is to say the sphere 40 and the valve pin 14 in the exemplary embodiment shown, is assigned a guide 43. The guide 43 is in the form of a sleeve. The guide 43 does not only hold the sphere 40 centrally under the valve pin 12, it also holds the end, projecting downwardly out of the drinking valve 42, of the valve needle 41 of the valve pin 14 on the longitudinal center axis 19 of the drinking valve 12 and contributes to the valve pin 14 also not being able to tilt or at least not to tilt appreciably. The guide 43 made for example of plastics material is plugged or screwed from below onto a subregion, projecting out of the water supply pipe 10, of the drinking valve 12, preferably the housing 13 thereof. In this way, the guide 43 is held in a force- or form-fitting manner by the drinking valve. A longitudinal center axis of the cylindrical sleeve-like guide 43 is also located on the longitudinal center axis 19 of the drinking valve 12.

Directly under the housing 13, the guide 43 has a circumferential constriction 44, which is dimensioned such that it has a through-bore corresponding to the outside diameter of the valve needle 41, the valve needle 41 of the valve pin 14 being movable merely up and down in said through-bore, but lateral tilting of the valve pin 14 is also at least virtually prevented by the constriction 44. The sphere 40 of the transmission means is mounted in a lower end region within the sleeve-like guide 43. The sphere 40 is secured against falling out of the guide 43 by a slight constriction 45 on the lower end side of the sleeve-like guide 43. However, the constriction 45 is not circumferential. It extends only in two regions on opposite sides of the guide surfaces 39 extending in the longitudinal direction of the water supply pipe 10. A continuous groove 46 is located in the lower region of the guide 43 in the longitudinal direction of the guide surface 39, said groove 46 being somewhat wider than the guide surface 39, such that the hollow-like guide surface 39 can extend through the groove 46, in particular with its higher opposite end regions, to be precise without coming into contact with the guide 43.

The length and the diameter of the rod 27 of the actuating means 25 are adapted to the contour of the water-accommodating hollow such that, from the inner side of the water-accommodating hollow 22, the pivot angle of the actuating means 25 is limited in opposite directions in a vertical plane longitudinally under the water supply pipe 10. As a result, the actuating means 25 can only be pivoted to such an extent in both directions of the vertical plane under the water supply line 10 that the sphere 40 of the transmission means always remains in the region of the guide surface 39 of the hollow 38.

Figure 2:
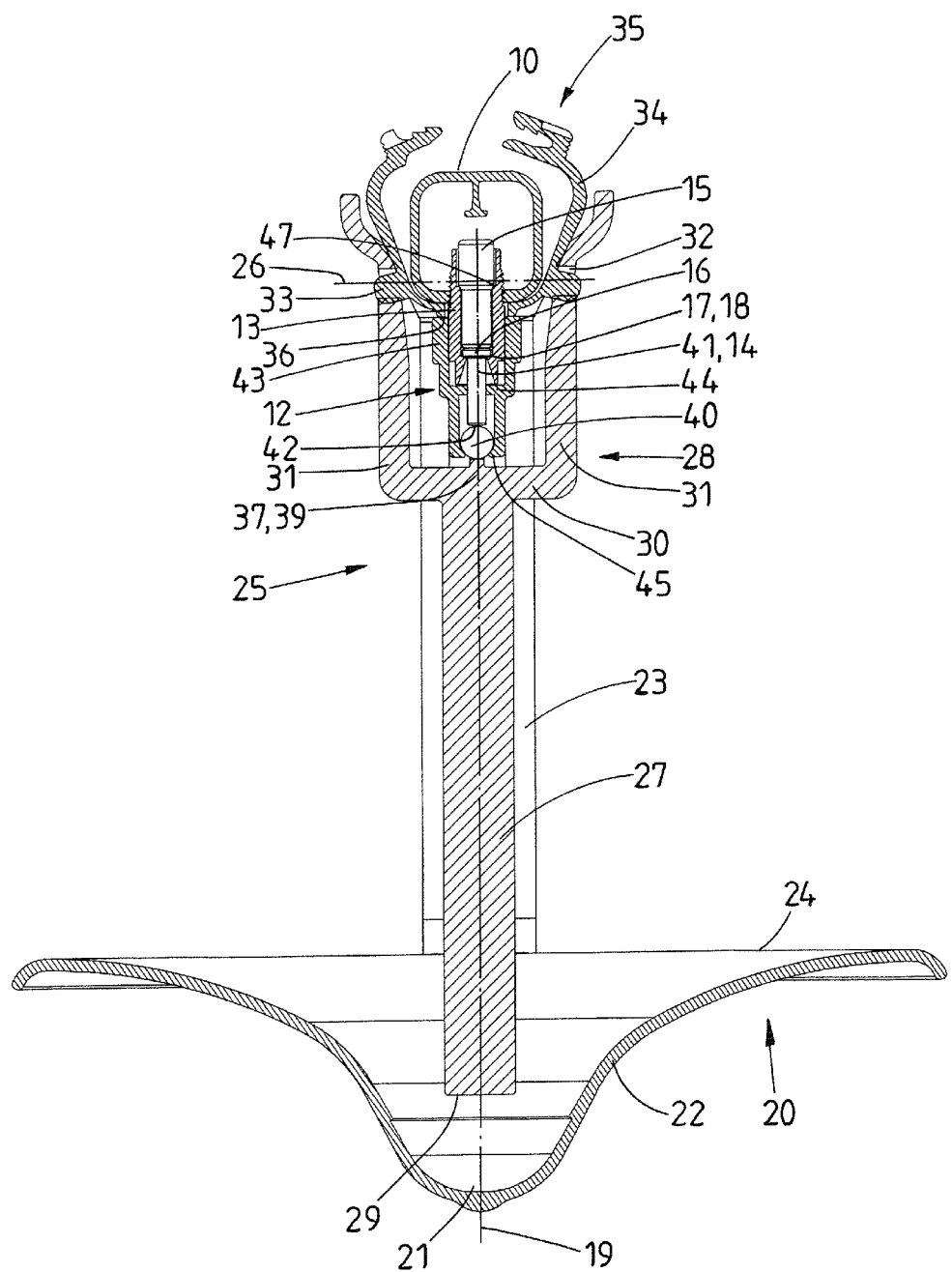
FIG. 2 shows a cross section through the animal drinker from FIG. 1 in its closed position.
Figure 3:
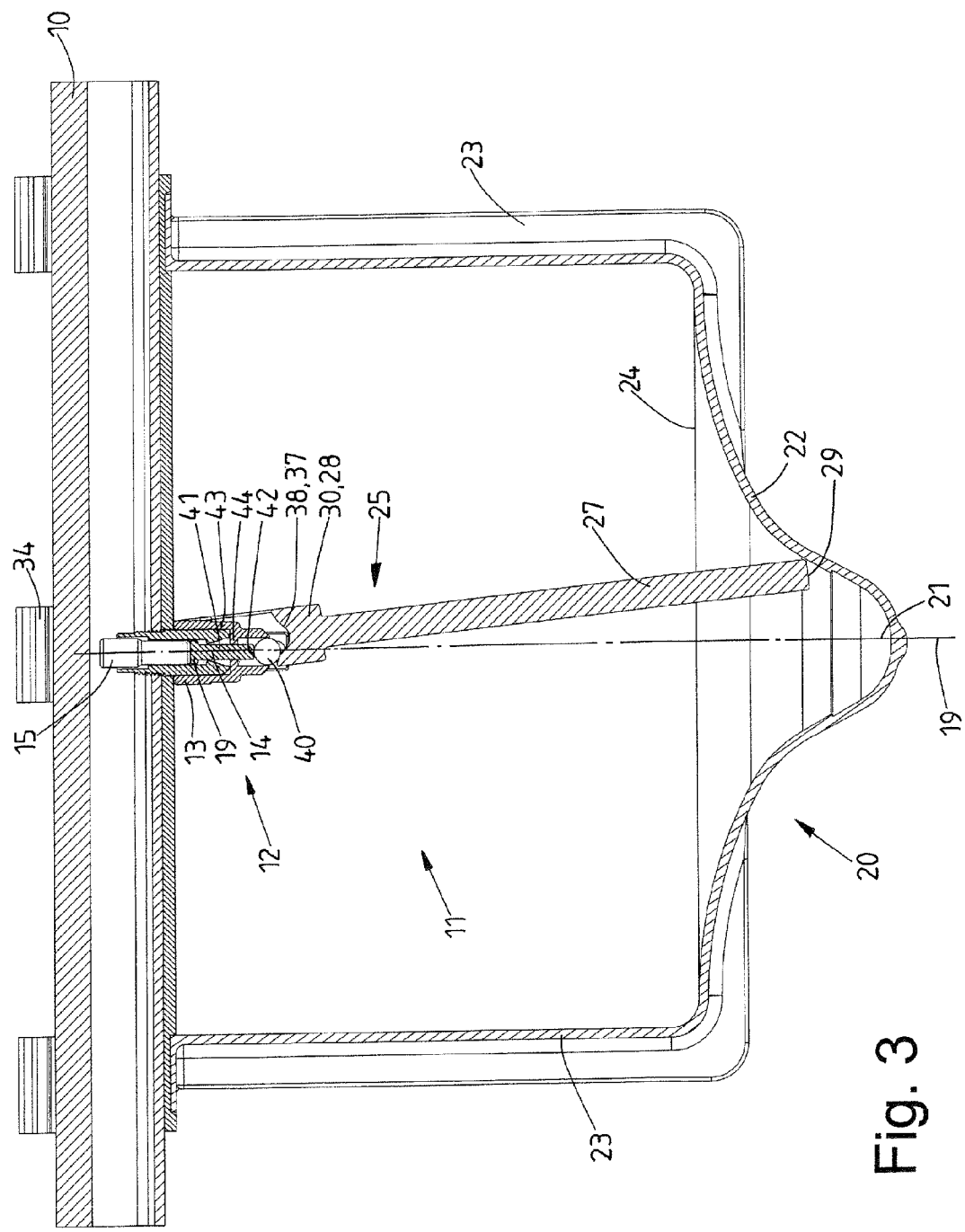
FIG. 3 shows a view similar to FIG. 1 in an open position of the drinking valve.
Figure 4:
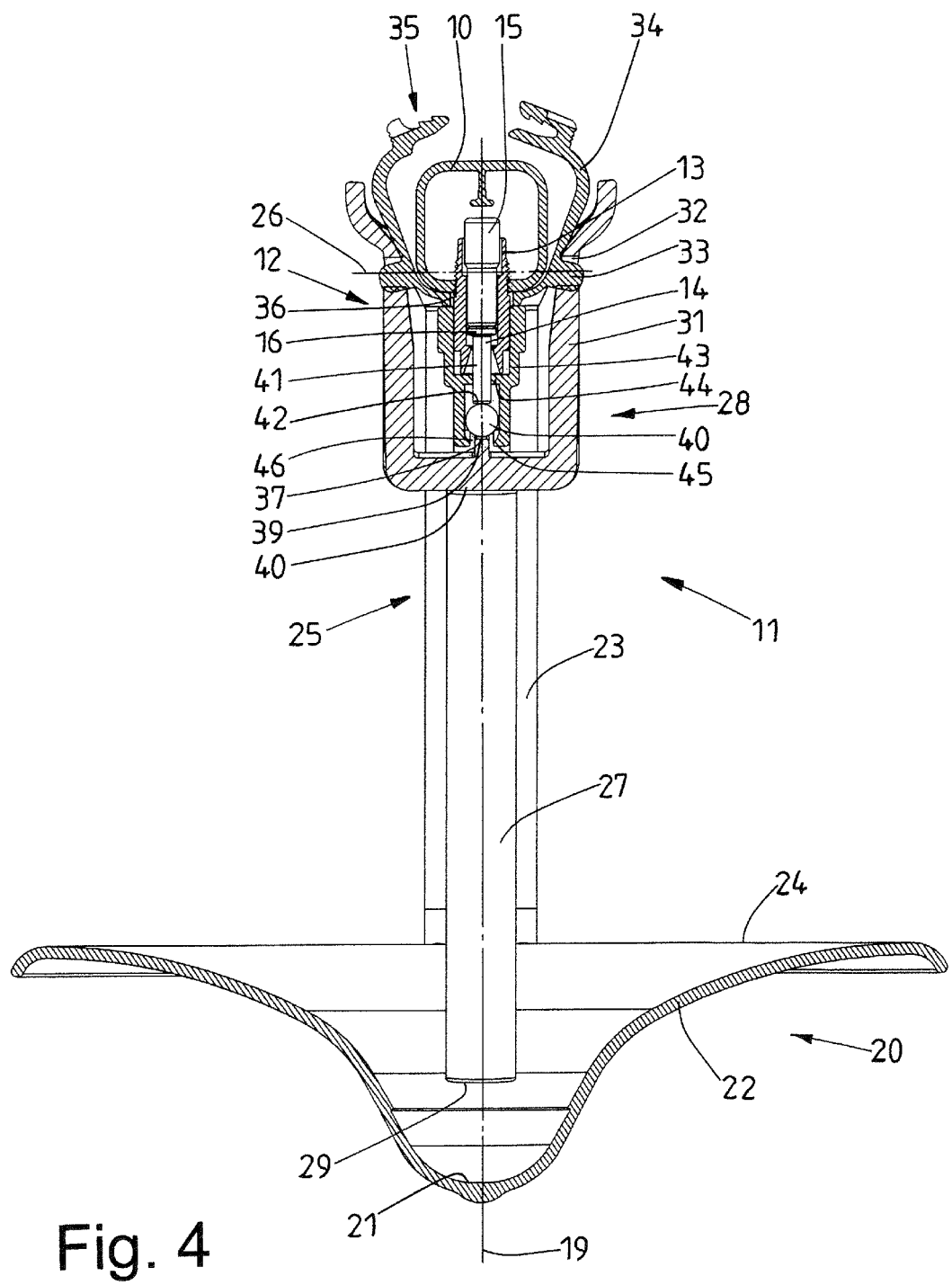
FIG. 4 shows a view similar to FIG. 2 in the open position of the drinking valve.
Figure 5:
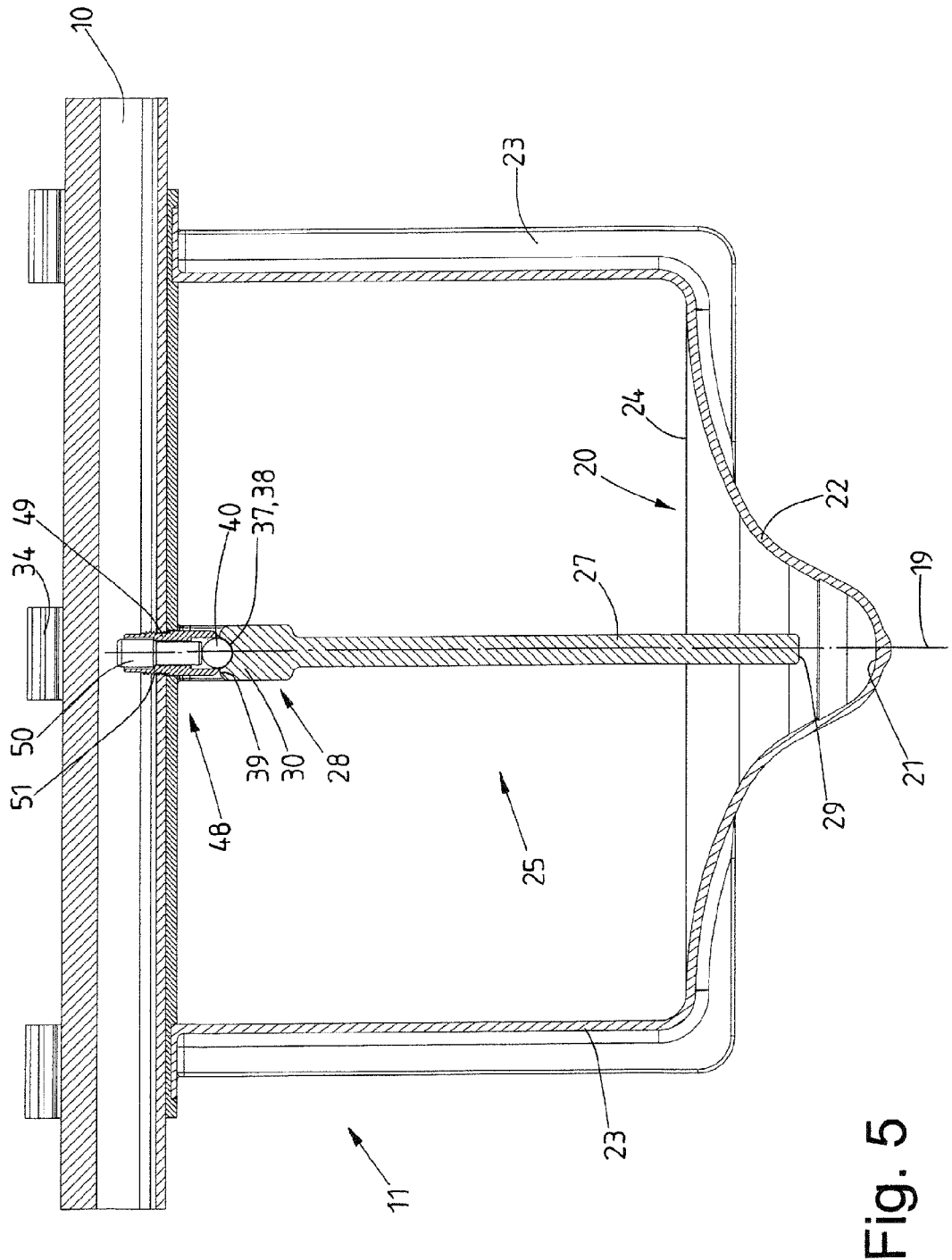
FIG. 5 shows a second exemplary embodiment of an animal drinker in a view similar to FIG. 1.
Figure 6:
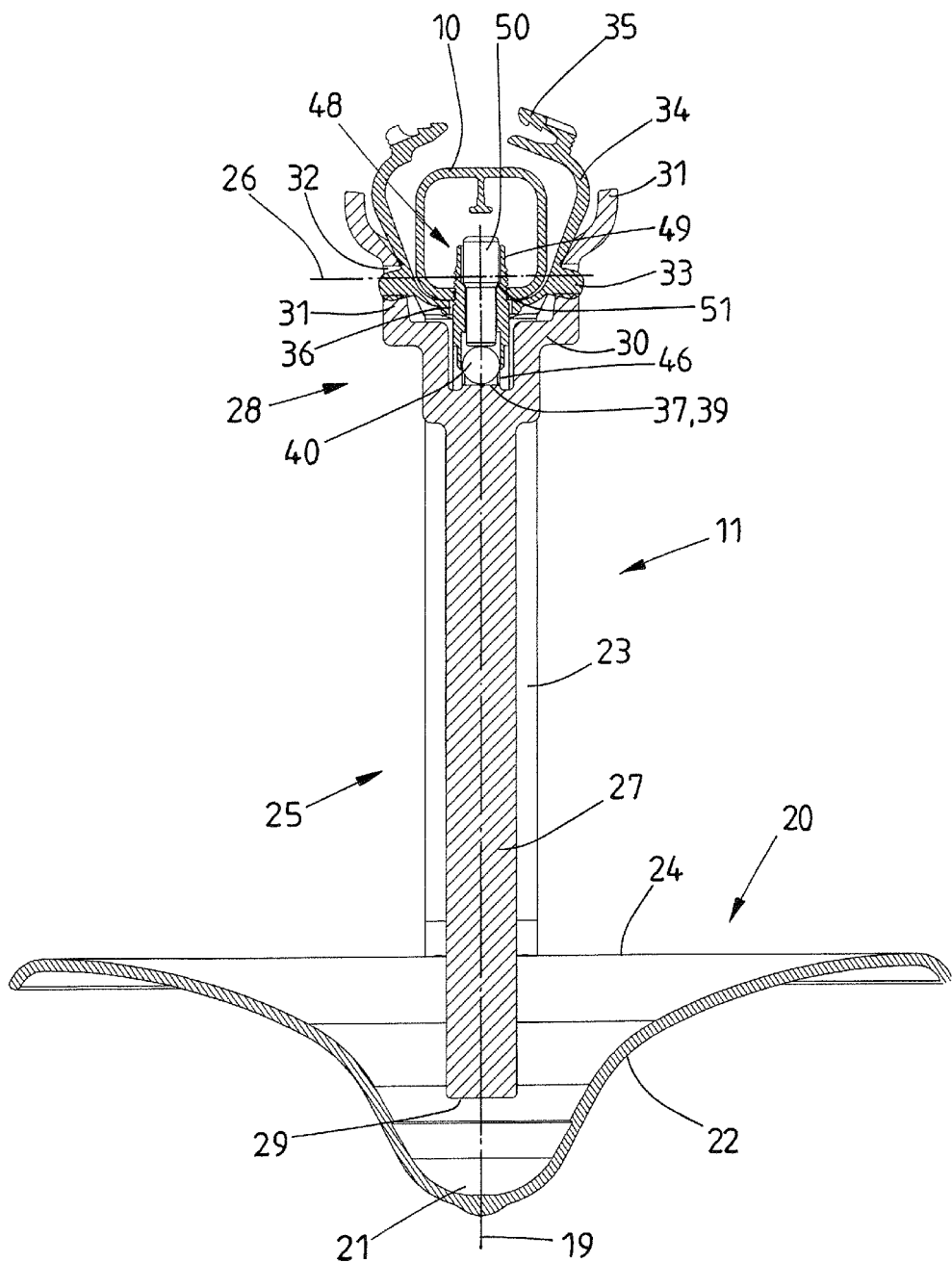
FIG. 6 shows a cross section through the animal drinker from FIG. 5 in its closed position.
Figure 7:
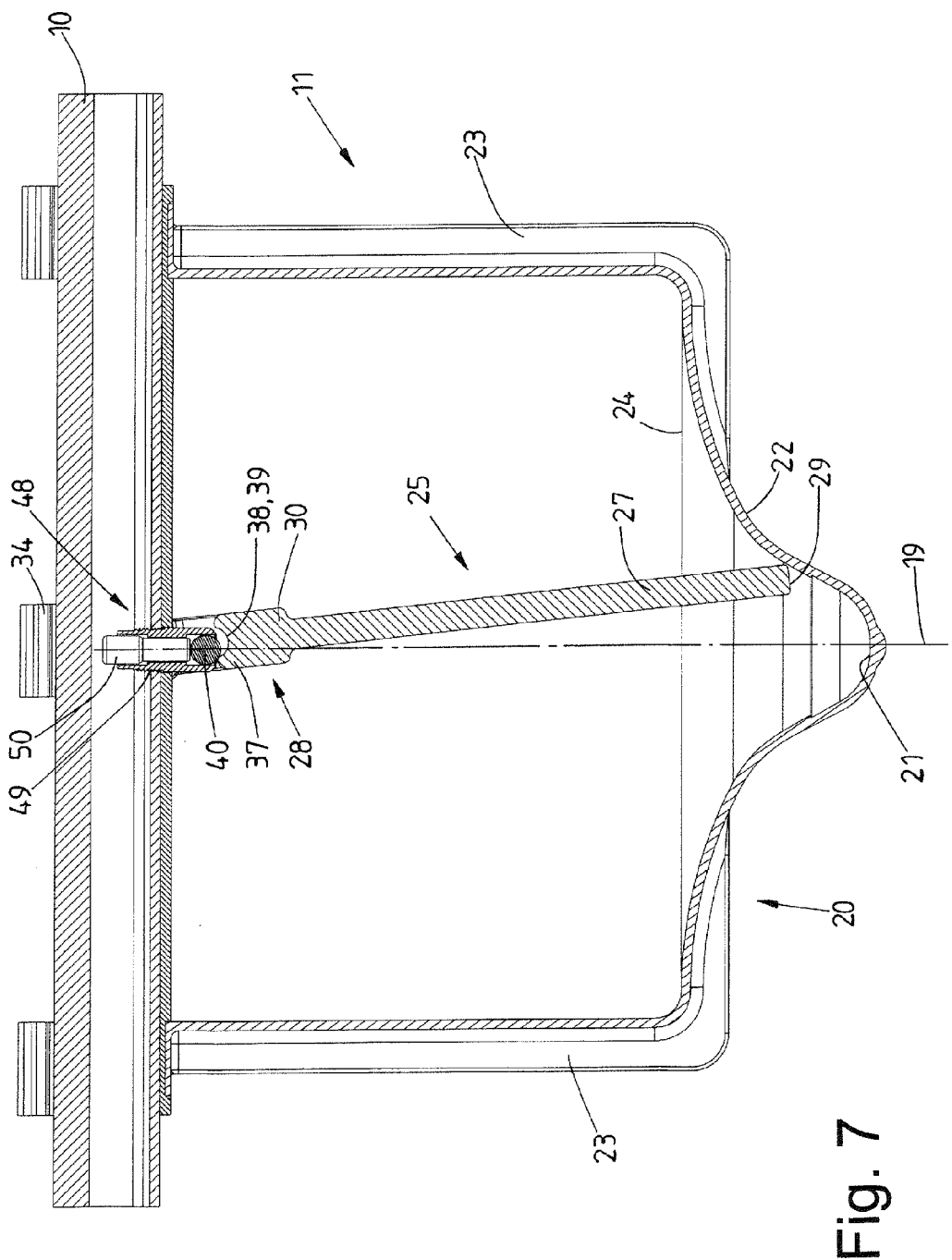
FIG. 7 shows the animal drinker in an open position of the drinking valve in an illustration similar to FIG. 5.
Figure 8:
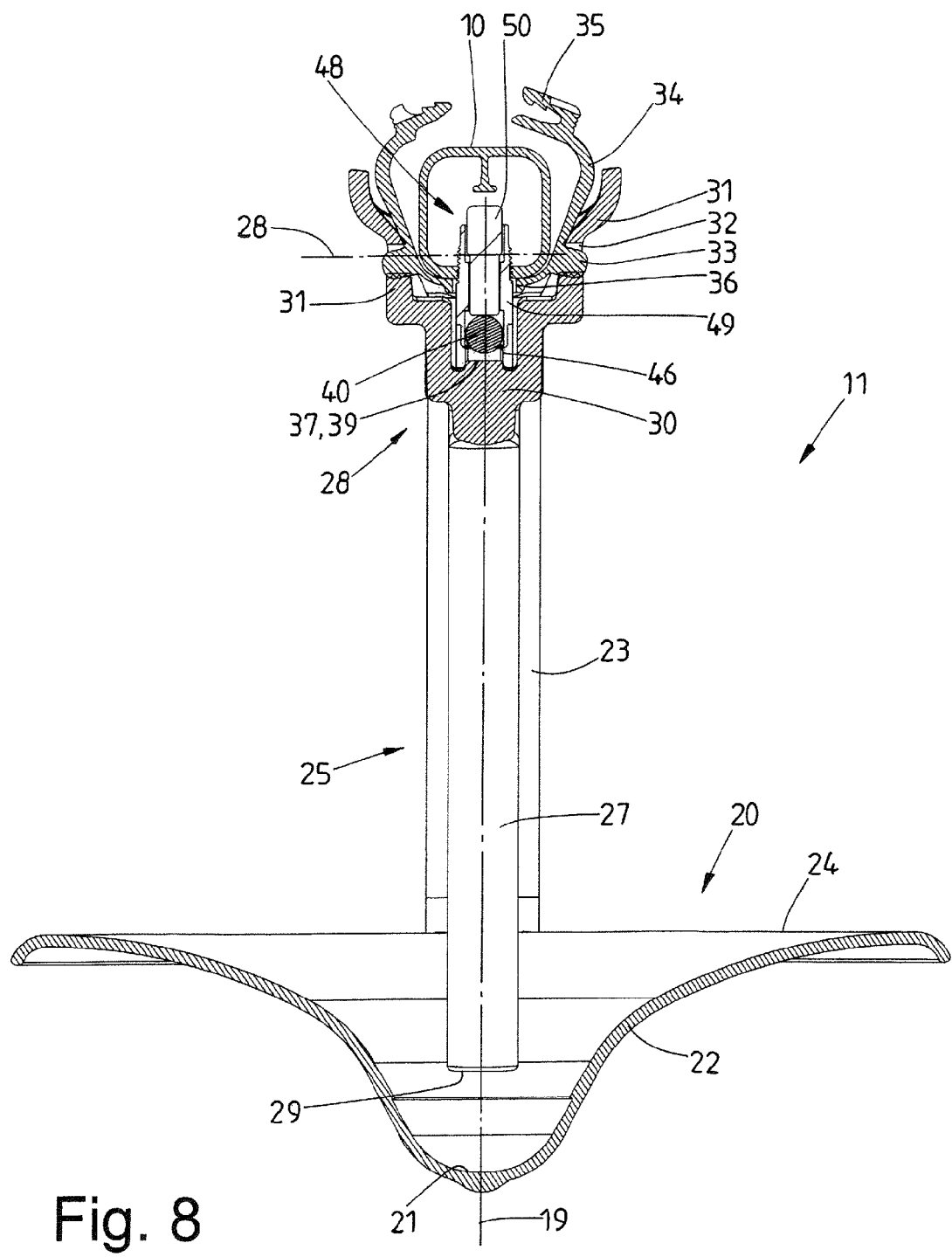
FIG. 8 shows a view similar to FIG. 6 in the open position of the drinking valve.

FIGS. 1 and 2 show the closed position of the drinking valve 12. In this position, the actuating means 25 is in the non-deflected starting position. In this starting position, the longitudinal center axis of the rod 27 of the actuating means 25 extends in continuation of the longitudinal center axis 19 of the drinking valve 12. The lower end 29 of the rod 27 is in this case located centrally above the lowest point 21 of the water-accommodating hollow 22 of the water-collecting bowl 20.

In the non-deflected starting position of the actuating means 25, the drinking valve 12 is closed. The head 16 of the valve pin 14 rests in this case against the sealing surface 17 of the housing 13 such that the valve pin 14 is sealed off from the housing 13 of the drinking valve 12. In this case, the lower, horizontal end face 42 of the valve needle 41 of the valve pin 14 does not rest against the sphere 40, but is located a small distance above the sphere 40, such that a small gap remains between the sphere 40 and the end face 42 of the valve pin 14, said gap ensuring that the drinking valve 12 is closed reliably by the valve pin 14. The sphere 40 is in this case located centrally in the hollow 38 of the guide track 37 on the crosspiece 30 of the fork 28 of the actuating means 25, that is to say at the lowest point of the guide track 37.

When the actuating means 25 is pivoted in any direction in the vertical plane longitudinally under the water supply pipe 10, the sphere 40 is lifted vertically on the longitudinal center axis 19 of the drinking valve 12 by the guide surfaces 39, rising on opposite sides of the hollow 38, of the guide track 37. In this case, the sphere 40 moved upwards by the guide track 37 pushes on a point, located centrally on the longitudinal center axis 19 of the valve pin 14, under the planar end face 42 of the valve needle 41 of the valve pin 14, with the result that a vertically upwardly directed force, located on the longitudinal center axis 19, acts on the valve pin 14 and pushes the latter upwards together with the upper pin 15 in the housing. The valve pin 14 is also lifted by the lifted sphere 40, namely moved upwards in a rectilinear manner on the longitudinal center axis 19. In this case, the drinking valve 12 is opened in that the sealing seat 18 between the head 16 of the valve pin 14 and the housing 13 is opened. Preferably, when the valve pin 14 is lifted by the sphere 40, the upper pin 15 is also lifted, that is to say moved upwards. As a result, a sealing seat 47, present in the exemplary embodiment shown, between the upper pin 15 and the housing 13 is also opened. The invention is also suitable for drinking valves in which there is no sealing seat 47 between the upper pin 15 and the housing 13. The invention is also suitable for drinking valves 12 in which only a sealing seat 47 is provided between the upper pin 15 and the housing 13 and no sealing seat 18 is provided between the head 16 of the valve pin 14 and the housing 13.

As soon as the animal present at the animal drinker releases the actuating means 25, the actuating means 25 returns automatically, to be precise under gravity, into the non-deflected starting position, in which the rod 27 is located on the longitudinal center axis 19 of the drinking valve 12. In this case, the sphere 40 passes back into the lowest position of the hollow 38 of the guide track 37, such that the valve pin 14 and also the upper pin 15 automatically move linearly downwards again, under gravity, in the housing 13 of the drinking valve 12 and as a result the drinking valve 12 is closed again in the region of the sealing seat 18 and/or of the sealing seat 47, and in particular the head 16 of the valve pin 14 rests against the sealing surface 17 of the housing 13 again.

FIGS. 5 to 8 show a second exemplary embodiment of the animal drinker according to the invention. This animal drinker differs from that of the exemplary embodiment in FIGS. 1 to 4 only by different drinking valves 48. Otherwise, the animal drinker in FIGS. 5 to 8 corresponds to that in FIGS. 1 to 4, for which reason identical reference signs are used for identical parts.

In particular the actuating means 25 and the transmission means which is assigned to the latter and is also embodied as a sphere again in the exemplary embodiment shown, correspond, primarily in terms of their function, to the first exemplary embodiment in FIGS. 1 to 4.

The drinking valve 48 of the animal drinker of this second exemplary embodiment (FIGS. 5 to 8) has a housing 49 made of preferably stainless steel, which is screwed from below into the water supply pipe 10. Only an upper pin 50 is located in the housing 49 of the drinking valve 48. The drinking valve 48 does not have a valve pin 14 as is present in the drinking valve 12 of the first exemplary embodiment. There is no valve pin 14 in the case of the drinking valve 48. The functions of the valve pin 14 are assumed, in the case of the drinking valve 48, by the actuating means 25 and the transmission means assigned thereto, to be precise the sphere 40 or some other rolling body. The actuating means 25 and the transmission means thus replace the valve pin 14 of the drinking valve 12 according to the first exemplary embodiment.

The sealing off of the drinking valve 48 is assumed by the upper pin 50. Accordingly, in the case of the drinking valve 48, the upper pin 50 represents the valve body. The cylindrical elongate upper pin 50 is stepped. In a manner corresponding thereto, the inside diameter of the housing 49 is stepped. The steps in the housing 49 and on the outside of the upper pin 50 correspond such that, in the closed position, shown in FIGS. 5 and 6, of the drinking valve 48, when the step on the upper pin 50 rests against the step in the housing 49, a sealing seat 51 is formed. This sealing seat 51 corresponds approximately to the sealing seat 47 of the drinking valve 12.

On account of there being no valve pin 14 in the case of the drinking valve 48, the transmission means for converting the pivoting movement of the actuating means 25 is arranged between the actuating means 25 and the upper pin 50. The transmission means, configured as a sphere 40 here too, projects partially into the housing 49 from below. As a result, the sphere 40 is at least guided and optionally also mounted in a lower region of the housing 49. This guidance and/or mounting of the sphere 40 in the housing 49 takes place such that, when the actuating means 25 is pivoted, the sphere 40 is movable up and down in a rectilinear manner on the longitudinal center axis 19 in order to open the drinking valve by lifting the upper pin 50, which, as a result, is pushed upwards in a rectilinear manner on the longitudinal center axis 19 in the housing 49.

The lifting of the sphere 40 on a rectilinear, vertical path on the longitudinal center axis 19 also takes place in the case of the animal drinker of this second exemplary embodiment by way of the guide track 37, provided with the central hollow 38, on the crosspiece 30 of the fork 28 of the actuating means 25. When the actuating means 25 is pivoted, the sphere 40 rolls on the guide surface 39 of the guide track 37, with the result that the sphere 40 is movable up and down in a manner guided in the housing 49 of the drinking valve 48 when the actuating means 25 is pivoted. In this case, the sphere 40 is pushed further into the housing 49 from below by the pivoting of the actuating means 25. If the actuating means 25 is released, the latter returns automatically into the vertical starting position on the longitudinal center axis 19, with the result that the sphere 40 returns into the lowest position of the hollow 37 of the guide track 38 and as a result moves downwards on the longitudinal center axis 19. In this case, the upper pin 50 drops under gravity in the housing 49 on account of its own weight, and thus automatically, until the drinking valve 48 is closed at the sealing seat 51 between the housing 49 and the upper pin 50. In this case, the lower end face of the upper pin 50 no longer rests against the sphere 40, and is in particular not supported on the sphere 40.

Otherwise, the function and mode of operation of the animal drinker of the second exemplary embodiment according to FIGS. 5 to 8 corresponds to the first exemplary embodiment in FIGS. 1 to 4, to which reference is made with regard to the common features between the two exemplary embodiments of the invention.

LIST OF REFERENCE SIGNS

10 Water supply pipe
11 Drinking point
12 Drinking valve
13 Housing
14 Valve pin
15 Upper pin
16 Head
17 Sealing surface
18 Sealing seat
19 Longitudinal center axis
20 Water-collecting bowl
21 Lowest point
22 Water-accumulating hollow
23 Support arm
24 Edge
25 Actuating means
26 Pivot axis
27 Rod
28 Fork
29 Lower end
30 Crosspiece
31 Leg
32 Through-bore
33 Bearing pin
34 Holder
35 Latching closure
36 Through-bore
37 Guide track
38 Hollow
39 Guide surface
40 Sphere
41 Valve needle
42 End face
43 Guide
44 Constriction
45 Constriction
46 Groove
47 Sealing seat
48 Drinking valve
49 Housing
50 Upper pin
51 Sealing seat

What is claimed is:

1. An animal drinker for poultry, having a plurality of drinking valves (12) assigned to a water supply pipe (10), wherein each drinking valve (12) has a housing (13) and at least one valve body arranged in a movable manner therein, and an actuating means (25), by way of which the valve body is movable into the at least one position opening the respective drinking valve (12), wherein the at least one valve body for opening the drinking valve (12) is liftable by the actuating means (25), and further comprising a transmission means operatively connected to at least to the valve body or to the actuating means (25).

2. The animal drinker according to claim 1, wherein the valve body is liftable in a rectilinear manner by the actuating means (25) being moved.

3. The animal drinker according to claim 1, wherein the valve body is liftable in a rectilinear manner on a vertical longitudinal center axis (19) of the drinking valve (12) by the actuating means (25) being moved.

4. The animal drinker according to claim 1, wherein the actuating means (25) has at least one guide track (37) which lifts at least the valve body when the actuating means (25) is pivoted to the side.

5. The animal drinker according to claim 4, wherein the transmission means corresponds to the guide track (37) of the actuating means (25).

6. The animal drinker according to claim 4, wherein the transmission means is supported on the guide track (37).

7. The animal drinker according to claim 4, wherein the transmission means is in the form of a rolling body.

8. The animal drinker according to claim 7, wherein a rotation axis of the rolling body of the transmission means perpendicularly intersects a longitudinal center axis (19) of the valve body.

9. The animal drinker according to claim 7, wherein a rotation axis of the rolling body extends horizontally.

10. The animal drinker according to claim 1, wherein the transmission means is arranged under the valve body.

11. The animal drinker according to claim 1, wherein the transmission means is arranged between the valve body and the actuating means (25).

12. The animal drinker according to claim 1, wherein the actuating means (25) is pivotable about a pivot axis (26).

13. The animal drinker according to claim 12, wherein the pivot axis (26) is transverse to and through a longitudinal center axis (19) of the drinking valve (12).

14. The animal drinker according to claim 12, wherein the actuating means (25) is pivotable about the pivot axis (26) above the valve body.

15. The animal drinker according to claim 12, wherein the actuating means (25) is pivotable about the pivot axis (26) in a position fixed relative to the drinking valve (12).

16. The animal drinker according to claim 12, wherein the actuating means (25) is pivotable about the pivot axis (26) at a distance above the transmission means.

17. The animal drinker according to claim 12, wherein the pivot axis (26) and the rotation axis are parallel to one another, wherein the pivot axis (26) and the rotation axis are perpendicular through the upright longitudinal center axis (19) of the drinking valve (12).

18. The animal drinker according to claim 12, wherein a free, lower end of the actuating means (25) extends into a water-accommodating hollow (22) of a water-collecting bowl (20) assigned to at least one drinking valve (12), and pivoting of the actuating means (25) is limitable by a wall of the water-collecting bowl (20).

19. An animal drinker for poultry, having a plurality of drinking valves (12) assigned to a water supply pipe (10), wherein each drinking valve (12) has a housing (13) and at least one valve body arranged in a movable manner therein, said valve body being assigned an actuating means (25), by way of which the valve body is movable into the at least one position opening the respective drinking valve (12), wherein the at least one valve body for opening the drinking valve (12)

is liftable by the actuating means (25), and wherein the actuating means (25) has a rod (27) and a fork (28) at the upper end of the rod (27).

20. The animal drinker according to claim 19, further comprising a guide track (37) for the transmission means, the guide track (37) being located on a crosspiece (30), connected to the rod (27), of the fork (28).

21. The animal drinker according to claim 19, wherein when the actuating means (25) is not deflected, a longitudinal center axis of the rod (27) of the actuating means (25) is located on a longitudinal center axis (19) of the drinking valve (12), and when the actuating means (25) is not deflected, the drinking valve (12) is closed.

22. The animal drinker according to claim 19, wherein the actuating means (25) is pivotable about a pivot axis (26), and wherein the actuating means (25) is mounted on the pivot axis (26) by way of parallel legs (31) of the fork (28).

23. The animal drinker according to claim 19, wherein the actuating means (25) is mounted on a holder (34), which is connectable to the water supply pipe (10), by way of parallel legs (31) of the fork (28).

24. An animal drinker for poultry, having a plurality of drinking valves (12) assigned to a water supply pipe (10), wherein each drinking valve (12) has a housing (13) and at least one valve body arranged in a movable manner therein, said valve body being assigned an actuating means (25), by way of which the valve body is movable into the at least one position opening the respective drinking valve (12), wherein the at least one valve body for opening the drinking valve (12) is liftable by the actuating means (25), and wherein a lower end region of the drinking valve (12) is assigned a guide (43) for the lower end region, projecting downwardly out of the housing (13) of the drinking valve (12), of the valve body.

* * * * *